United States Patent Office 3,337,614
Patented Aug. 22, 1967

3,337,614
SULFOACRYLIC ACIDS AND A PROCESS FOR THEIR PREPARATION
James F. Vitcha, New Providence, N.J., and Lester Weintraub, Bronx, N.Y., assignors to Air Reduction Company, Incorporated, New York, N.Y., a corporation of New York
No Drawing. Filed Oct. 30, 1963, Ser. No. 319,942
12 Claims. (Cl. 260—513)

This invention is concerned with the preparation of sulfoacrylic acid and is more particularly concerned with a method for producing disulfoacrylic acid.

Sulfoacrylic acids have been heretofore produced, e.g. by reacting a chlorinated carboxylic acid with a sulfonating agent, with treatment to effect dehydrohalogenation. For example, Backer and Mulder (Rec. Trav. Chim., 62, 46–56 (1943)) show the sulfonation of beta-chloropropionic acid with $H_2SO_4$ to which $SO_3$ is added, followed by dehydrohalogenation, and Backer and Beute (Rec. Trav. Chim., 54, 523–30 (1935)) show the reaction of chloroacrylic acid with ammonium sulfite. The product produced is described as alpha or beta sulfoacrylic acid.

It is an object of this invention to provide a process of producing sulfoacrylic acids which does not involve the use of a halogenated carboxylic acid as the starting material.

It is another object of the invention to provide a process of the character indicated which is effective to produce disulfoacrylic acid.

In accordance with the invention, a sulfoacrylic acid, more particularly disulfoacrylic acid, is produced by reacting acetylene and carbon monoxide in the presence of oleum, viz "fuming" sulfuric acid, which is a solution of sulfur trioxide in sulfuric acid, and is conventionally characterized as $H_2S_2O_7$ or $SO_3(H_2SO_4)$, followed by hydration with $H_2O$, suitably in the form of ice. Liquid sulfur trioxide can be used in place of oleum, but it is preferred to use oleum from the standpoint of ease of handling. This reaction may be exemplified by the following equation, the formation of intermediates and intermediate reactions being disregarded:

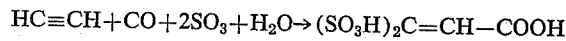

$$HC{\equiv}CH + CO + 2SO_3 + H_2O \rightarrow (SO_3H)_2C{=}CH{-}COOH$$

The foregoing reaction has been found to proceed smoothly in high yield, and the product is directly produced merely by pouring the reaction mixture over ice to effect the final hydration step. The product thus produced is a very viscous oily liquid and the disulfoacrylic acid is suitably isolated as a salt, e.g. a barium salt, by treating the viscous oil with, for example, an inorganic barium salt such as barium carbonate. Purification of the salt is suitably accomplished by recrystallization from hot water.

The reaction proceeds readily without application of heat and, advantageously, the mixture of reactants is cooled, e.g. to 0°–15° C. Carbon monoxide is a gas and it must, therefore, be supplied to the reaction system under pressure, but any convenient pressure may be employed. Particularly good results are obtained with pressures of 1000–1500 p.s.i.g., but pressures below and above this range can be utilized.

The reaction can be carried out in any vessel which is capable of handling a gas under the pressure employed and which is also resistant to attack by the reactants. A stainless steel autoclave is particularly suitable.

Oleum is supplied commercially in various grades which vary with respect to the content of $SO_3$ in the sulfuric acid, e.g. 10%, 20%, 40%, 60%, 66%, and the like. Any of these grades is suitable for use in the process of this invention. The amount of oleum employed is such that a stoichiometric quantity of $SO_3$ is present with respect to the acetylene, and the carbon monoxide is, of course, present in sufficient quantity to provide a stoichiometric amount in relation to the acrylic acid. Excess quantities of $SO_3$ and/or CO can be employed, e.g. 50% excess, but there is no particular advantage in such excess quantities.

The invention will now be illustrated by reference to a specific example of practical application, wherein all parts are by weight.

Into a stainless steel autoclave there were charged 200 ml. of 10% oleum into which was dissolved ½ mole of acetylene. The resulting solution was cooled to 12–15° C. and carbon monoxide was introduced under a pressure of 1200 p.s.i.g. The contents of the autoclave were maintained at 12–15° C. and reaction was continued until no further uptake of carbon monoxide was observed to take place, the carbon monoxide being introduced gradually for approximately 15 hours. A 1:1 uptake of carbon monoxide with respect to acetylene occurred. The reaction mixture was poured over ice and the resulting solution was neutralized with 900 grams of barium carbonate. The crude crystalline product which thus formed was recrystallized from hot water and there was thus obtained solid barium disulfoacrylate. The yield of disulfoacrylic acid, based on acetylene charged, was 80%. The barium disulfoacrylate did not melt when heated up to 300° C. and would tend to decompose when further heated. The salt produced was primarily the barium salt of alpha-beta disulfoacrylic acid, with some admixture of the barium salt of beta-beta-disulfoacrylic acid.

A conductometric titration of the free acid produced by passing an aliquot of the barium salt through Amberlite IR–20 (H⁺) cation exchange resin gave a conductance curve typical of a compound possessing a moderately strong acid group and a weak acid group.

Infrared absorption maxima for the free acid product appeared at $6.4\mu$ and $7\mu$ and at $8\mu$–$8.5\mu$ and $9.6\mu$.

An ultraviolet absorption maximum for the product occurred at 200 m$\mu$ with a E value of 4000.

Analysis.—Calcd. for $C_3H_2O_8S_2Ba \cdot H_2O$: C, 9.35; H, 1.04; S, 16.62; Ba, 35.58. Found: C, 9.95; H, 1.83; S, 16.3; Ba, 36.7.

The salt is readily converted to the free acid by any conventional means, e.g. by passage through a cation exchange resin, as mentioned, and the free oily, viscous acid is highly hydroscopic and is useful as a dehydrating agent.

It will be understood that various changes and modifications may be made without departing from the invention as defined in the appended claims. It is intended, therefore, that all matter contained in the foregoing description shall be interpreted as illustrative only and not as limitative of the invention.

We claim:

1. A method of making a disulfoacrylic acid which comprises reacting acetylene, carbon monoxide, and a member of the group consisting of oleum and liquid sulfur trioxide, without application of heat, with the carbon monoxide and the sulfur trioxide being in at least stoichiometric quantities with respect to the acetylene, and hydrating the resultant reaction product.

2. A method of making a disulfoacrylic acid which comprises reacting acetylene, carbon monoxide, and a member of the group consisting of oleum and liquid sulfur trioxide, without application of heat, with the carbon monoxide and the sulfur trioxide being in at least stoichiometric quantities with respect to the acetylene, and hydrating the resultant reaction product with ice.

3. A method of making a disulfoacrylic acid which comprises reacting acetylene, carbon monoxide, and a member of the group consisting of oleum and liquid sulfur trioxide at a temperature of 0° to 15° C., with the carbon monoxide and the sulfur trioxide being in at least stoichiometric quantities with respect to the acetylene, and hydrating the resultant reaction product.

4. A method of making a disulfoacrylic acid which comprises reacting acetylene, carbon monoxide, and a member of the group consisting of oleum and liquid sulfur trioxide at a temperature of 0° to 15° C. and at a pressure of 1000 to 1500 p.s.i.g., with the carbon monoxide and the sulfur trioxide being in at least stoichiometric quantities with respect to the acetylene, and hydrating the resultant reaction product.

5. A method of making a disulfoacrylic acid which comprises reacting acetylene, carbon monoxide, and a member of the group consisting of oleum and liquid sulfur trioxide at a temperature of 0° to 15° C. and at a pressure of 1000 to 1500 p.s.i.g., with the carbon monoxide and the sulfur trioxide being in at least stoichiometric quantities with respect to the acetylene, and hydrating the resultant reaction product with ice.

6. A method of making a disulfoacrylic acid which comprises reacting acetylene, carbon monoxide, and sulfur trioxide, without application of heat, with the carbon monoxide and the sulfur trioxide being in at least stoichiometric quantities with respect to the acetylene, and hydrating the resultant reaction product, said sulfur trioxide being supplied to the reaction as oleum.

7. A method of making a disulfoacrylic acid which comprises reacting acetylene, carbon monoxide, and sulfur trioxide at a temperature of 0° to 15° C. and at a pressure of 1000 to 1500 p.s.i.g., with the carbon monoxide and the sulfur trioxide being in at least stoichiometric quantities with with respect to the acetylene, and hydrating the resultant reaction product with ice, said sulfur trioxide being supplied to the reaction as oleum.

8. A method of making the barium salt of a disulfoacrylic acid which comprises reacting acetylene, carbon monoxide, and a member of the group consisting of oleum and liquid sulfur trioxide, without application of heat, with the carbon monoxide and the sulfur trioxide being in at least stoichiometric quantities with respect to the acetylene, hydrating the resultant reaction product, and reacting the hydrated product with an inorganic barium salt.

9. A method of making the barium salt of a disulfoacrylic acid which comprises reacting acetylene, carbon monoxide, and oleum, at a temperature of about 0° to 15° C., with the carbon monoxide and the sulfur trioxide being in at least stoichiometric quantities with respect to the acetylene, hydrating the resultant reaction product, and reacting the hydrated product with an inorganic barium salt.

10. A method of making the barium salt of a disulfoacrylic acid which comprises reacting acetylene, carbon monoxide, and oleum, at a temperature of about 0° to 15° C. and at a pressure of about 1000 to 1500 p.s.i.g., with the carbon monoxide and the sulfur trioxide being in at least stoichiometric quantities with respect to the acetylene, hydrating the resultant reaction product with ice, and reacting the hydrated product with an inorganic barium salt.

11. A compound selected from the group consisting of alpha, beta, disulfoacrylic acid and beta, beta, disulfoacrylic acid.

12. The barium salt of a compound selected from the group consisting of alpha, beta, disulfoacrylic acid and beta, beta, disulfoacrylic acid.

References Cited

UNITED STATES PATENTS 2,895,987  7/1959  Hendry _____ 260—601 XR

OTHER REFERENCES

Backer et al.: Recueil Travaux Chemique des Pays-Bas., vol. 62, 1943, pp. 46–52.

Gilbert: Chemical Reviews, vol. 62, No. 6, December 1962, page 568.

Reppe: Acetylene Chemistry, New York (1949), page 184.

LORRAINE A. WEINBERGER, *Primary Examiner.*

M. WEBSTER, *Assistant Examiner.*